(12) United States Patent
Takamoto et al.

(10) Patent No.: US 7,942,768 B2
(45) Date of Patent: May 17, 2011

(54) ELECTRICALLY OPERATED DERAILLEUR THAT RE-ENGAGES A DISENGAGED DERAILLEUR FORCE OVERLOAD CLUTCH

(75) Inventors: Ryuichirou Takamoto, Sakai (JP); Kazuhiro Fujii, Kawachinagano (JP); Masahiko Fukuda, Amagasaki (JP)

(73) Assignee: Shimano, Inc., Sakai-ku (JP)

(*) Notice: Subject to any disclaimer, the term of this patent is extended or adjusted under 35 U.S.C. 154(b) by 628 days.

(21) Appl. No.: 12/020,762

(22) Filed: Jan. 28, 2008

(65) Prior Publication Data
US 2009/0191994 A1 Jul. 30, 2009

(51) Int. Cl.
*F16H 61/00* (2006.01)
(52) U.S. Cl. .......................................... 474/82
(58) Field of Classification Search ............. 474/80, 474/82; 192/40, 84.6, 56.4
See application file for complete search history.

(56) References Cited

U.S. PATENT DOCUMENTS

| | | | |
|---|---|---|---|
| 2,839,939 A | 6/1955 | Juy | |
| 3,559,784 A * | 2/1971 | Miller | 192/56.43 |
| 3,919,891 A | 11/1975 | Stuhlmuller et al. | |
| 3,974,707 A | 8/1976 | Nagano | |
| 4,132,119 A | 1/1979 | Nagano et al. | |
| 4,185,510 A | 1/1980 | Juy | |
| 4,437,848 A | 3/1984 | Shimano | |
| 4,507,101 A | 3/1985 | Nagano | |
| 4,734,084 A | 3/1988 | Nagano | |
| 4,861,320 A | 8/1989 | Nagano | |
| 4,946,425 A | 8/1990 | Buhlmann | |
| 5,328,414 A | 7/1994 | Ancarani | |
| 5,359,884 A | 11/1994 | Fey et al. | |
| 5,470,277 A | 11/1995 | Romano | |
| 5,480,356 A | 1/1996 | Campagnolo | |
| 5,494,307 A | 2/1996 | Anderson | |
| 5,518,456 A | 5/1996 | Kojima et al. | |
| 5,860,880 A | 1/1999 | Oka | |
| 6,162,140 A | 12/2000 | Fukuda | |
| 6,623,389 B1 | 9/2003 | Campagnolo | |
| 6,997,835 B2 | 2/2006 | Fukuda | |
| 2008/0227572 A1 * | 9/2008 | Sakaue | 474/82 |

FOREIGN PATENT DOCUMENTS

| | | |
|---|---|---|
| DE | 20008388 U1 | 10/2000 |
| EP | 1609716 A2 | 12/2005 |
| EP | 1970299 A2 | 9/2008 |
| FR | 2587079 A1 | 3/1987 |

OTHER PUBLICATIONS

European Search Report for EP 08162294.6, the European application that corresponds to this application, dated Jun. 25, 2009.

* cited by examiner

*Primary Examiner* — Michael R Mansen
*Assistant Examiner* — Juan J Campos
(74) *Attorney, Agent, or Firm* — James A. Deland

(57) ABSTRACT

A derailleur includes a motor that drives a drive member, a driven member driven by the drive member, and a clutch having a first element that disengages from a second element when substantial resistance exists in a power transmission path between the drive member and the driven member. An apparatus for controlling the derailleur comprises a re-engage command receiving circuit and a re-engagement circuit, wherein the re-engage command receiving circuit receives a re-engage command signal to re-engage the first element with the second element when the first element is disengaged from the second element, and the re-engagement circuit re-engages the first element with the second element in response to the re-engage command signal.

15 Claims, 8 Drawing Sheets

ELECTRICALLY OPERATED DERAILLEUR THAT RE-ENGAGES A DISENGAGED DERAILLEUR FORCE OVERLOAD CLUTCH

BACKGROUND OF THE INVENTION

The present invention is directed to bicycles and, more particularly, to various features of an electrically operated bicycle derailleur.

Derailleur operated bicycle transmissions typically comprise a plurality of sprockets that rotate with another rotating member (e.g., the front crank and/or the rear wheel of the bicycle) and a derailleur that is used to shift a chain among the plurality of sprockets. Conventional derailleurs comprise a base member adapted to be mounted to the bicycle frame, a movable member supporting a chain guide, and a linkage mechanism coupled between the base member and the movable member so that the movable member can move laterally inwardly and outwardly relative to the base member. Such derailleurs are controlled manually by a hand operated actuator such as a lever or twist-grip attached to the bicycle handlebar, wherein the derailleur is connected to the actuator by a Bowden cable.

Recently, various electronic devices have been developed to control the movement of the derailleur. Such devices sometimes comprise a traveling condition detector for detecting a traveling condition of the bicycle, a motor for moving the derailleur laterally inwardly and outwardly relative to the plurality of sprockets, and a processor. The processor controls the motor in response to the detected traveling condition so that the derailleur is placed in the proper position to maintain the traveling condition within a desired range.

The motor typically moves the derailleur laterally inwardly and/or laterally outwardly by moving an actuating member such as an actuating arm or a pivot shaft attached to the linkage mechanism. Unfortunately, sometimes the movable member experiences significant resistance to lateral movement, especially when the plurality of sprockets are stationary, and this resistance is communicated to the actuating member. Since the motor may be unable to move the actuating member in such a situation, there is a risk of damage to the motor. Another problem is the potential application of undesirable external forces to the movable member. Such external forces may be communicated to the actuating member, thereby risking damage to the motor. For example, an undesirable force directed toward the wheel may be applied to the derailleur when the bicycle falls down, or an undesirable force directed away from the wheel may be applied to the derailleur if the derailleur catches an external object.

To avoid damage to the derailleur, a clutch may be disposed in a power transmission path between the actuating member and the chain guide. The clutch may comprise first and second elements that disengage when significant resistance exists within the power transmission path. In some cases it may be necessary for the user to manually reengage the first and second members.

SUMMARY OF THE INVENTION

The present invention is directed to various features of an electrically operated bicycle derailleur. In one embodiment, the derailleur includes a motor that drives a drive member, a driven member driven by the drive member, and a clutch having a first element that disengages from a second element when substantial resistance exists in a power transmission path between the drive member and the driven member. An apparatus for controlling the derailleur comprises a re-engage command receiving circuit and a re-engagement circuit, wherein the re-engage command receiving circuit receives a re-engage command signal to re-engage the first element with the second element when the first element is disengaged from the second element, and the re-engagement circuit re-engages the first element with the second element in response to the re-engage command signal. Additional inventive features will become apparent from the description below, and such features alone or in combination with the above features may form the basis of further inventions as recited in the claims.

DETAILED DESCRIPTION OF THE EMBODIMENTS

Figure 1:
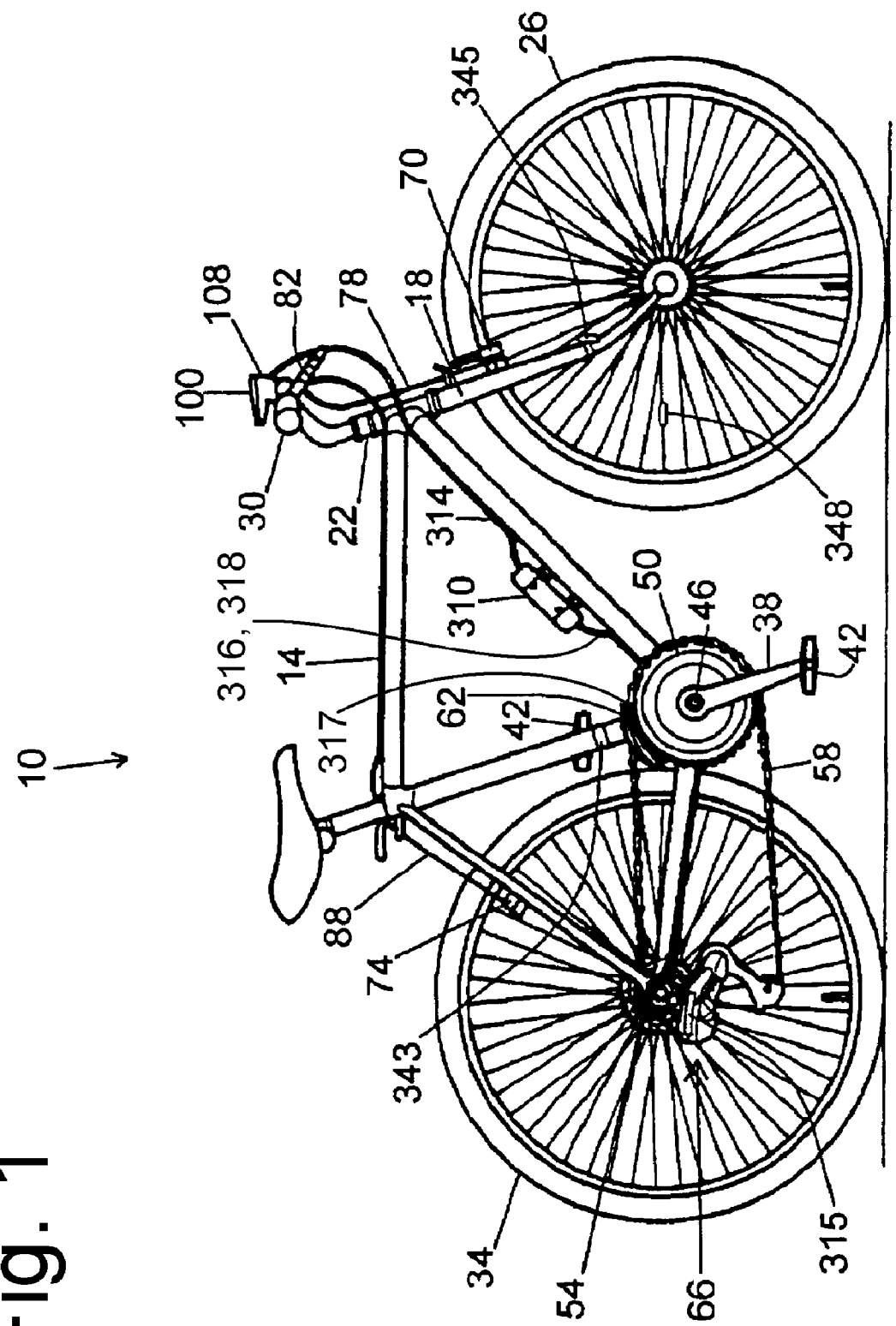
FIG. 1 is a side view of a bicycle that includes a particular embodiment of an electronically controlled bicycle transmission.
Figure 2:
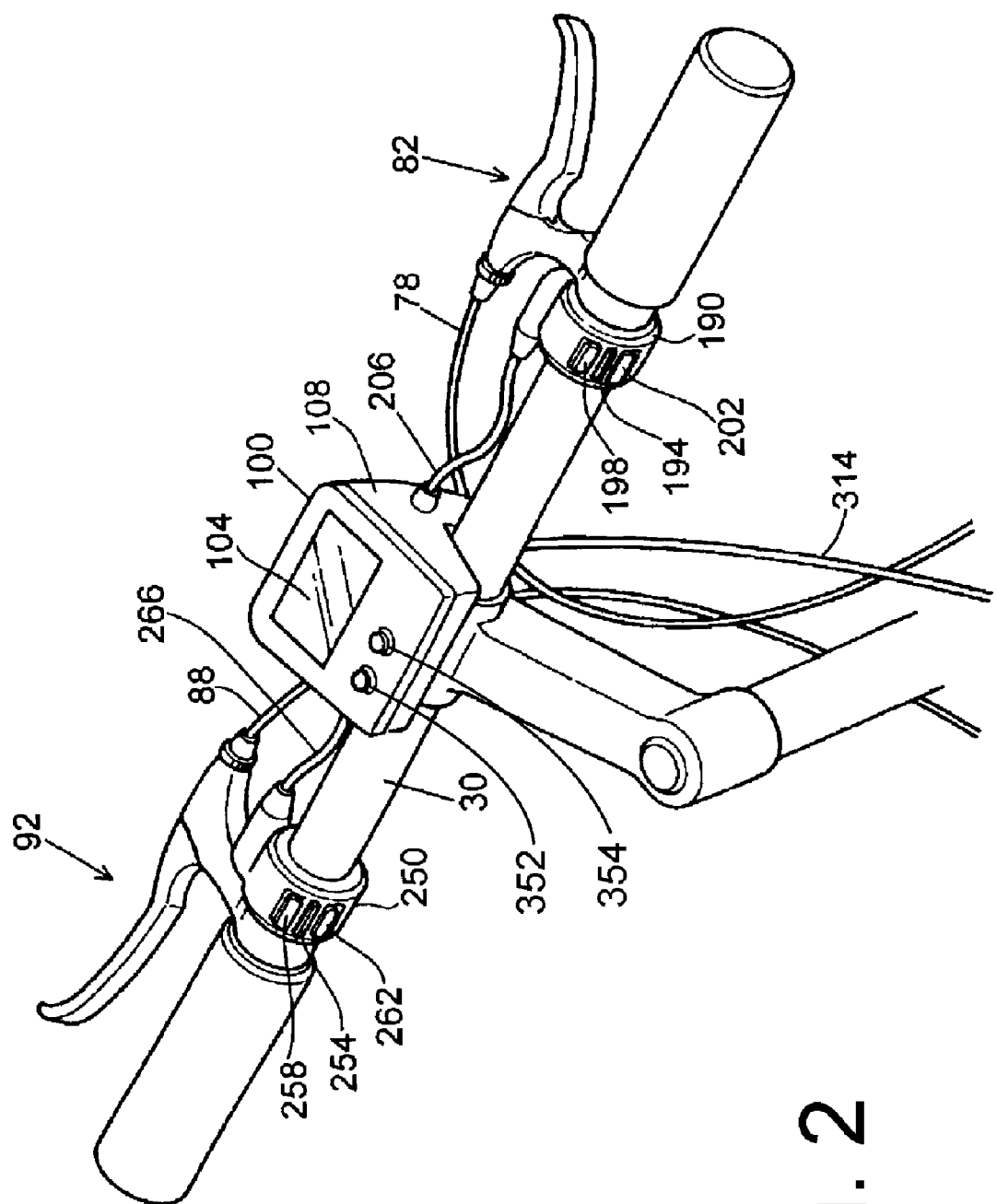
FIG. 2 is an oblique view of the handlebar mounted components of the electronically controlled bicycled transmission.

FIG. 1 is a side view of a bicycle 10 that includes a particular embodiment of an electronically controlled bicycle transmission. Bicycle 10 has a frame 14, a front fork 18 rotatably supported in a head tube 22 of frame 14, a front wheel 26 rotatably supported by fork 18, a handlebar 30 for rotating fork 18 (and hence front wheel 26) in the desired direction, and a rear wheel 34 rotatably supported at the rear of frame 14. A pair of crank arms 38, each supporting a pedal 42, are mounted to an axle 46 that is rotatably supported in a lower portion of frame 14. A plurality of front sprockets 50 are mounted to the right side crank arm 38 for rotating with the right side crank arm 38, and a sprocket unit 54 comprising a plurality of rear sprockets 54a-54g (FIG. 4) are mounted to rear wheel 34 for rotating with rear wheel 34. A chain 58 engages one of the plurality of front sprockets 50 and one of the plurality of rear sprockets 54a-54g. A front derailleur 62 is mounted to frame 14 in close proximity to the plurality of front sprockets 50 for moving chain 58 among the plurality of front sprockets 50, and a rear derailleur 66 is mounted to frame 14 in close proximity to sprocket unit 54 for moving chain 58 among the plurality of rear sprockets 54a-54g. A front braking unit 70 is mounted to fork 18 for braking front wheel 26, and a rear braking unit 74 is mounted to the rear of frame 14 for braking rear wheel 34. Front braking unit 70 is connected to a Bowden-type control cable 78 connected to a brake lever assembly 82 mounted on the right side of handlebar 30 as shown in FIG. 2. Similarly, rear braking unit 74 is connected to a Bowden-type control cable 88 connected to a brake lever assembly 92 mounted on the left side of handlebar 30.

Figure 3:
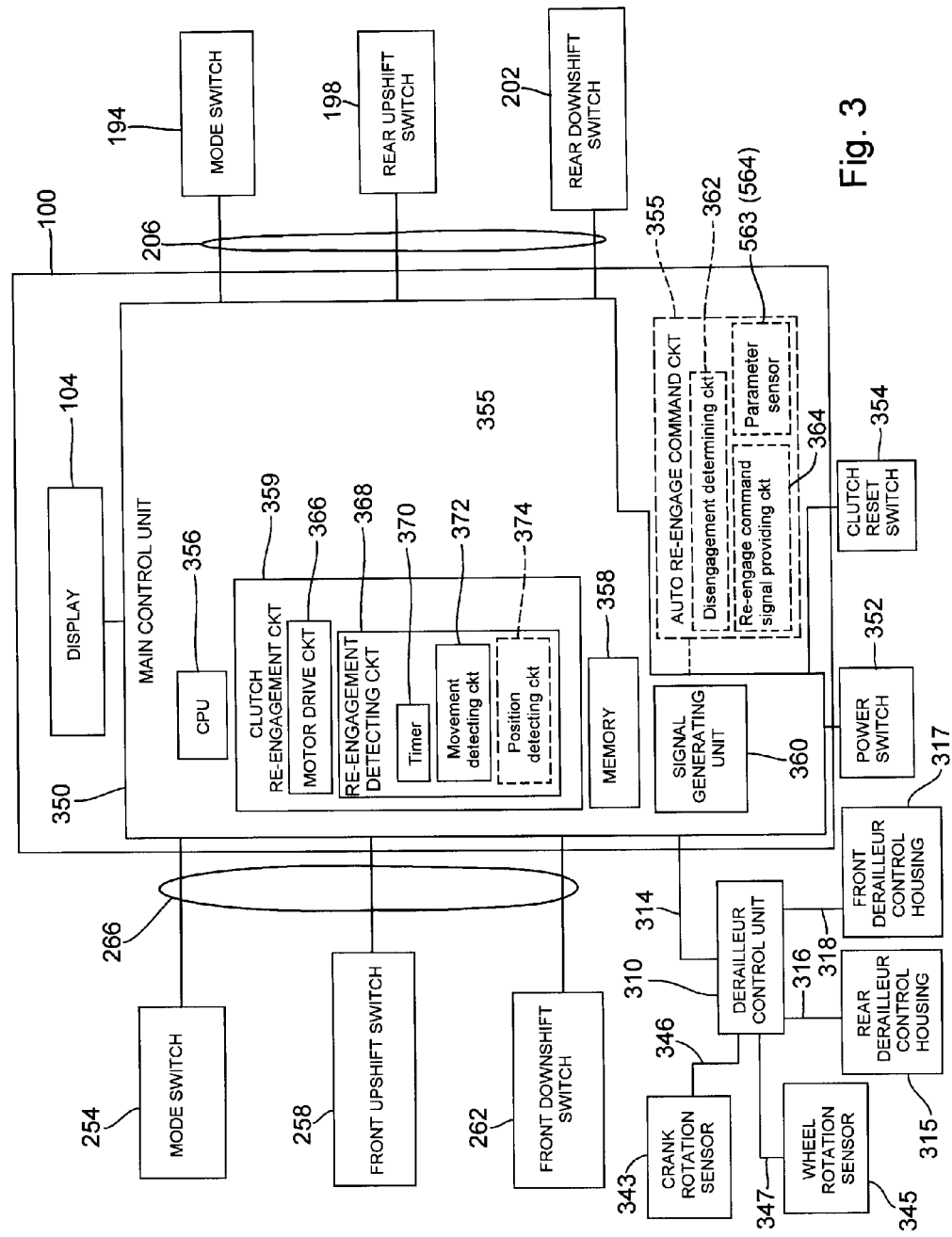
FIG. 3 is a block diagram of a particular embodiment of a control system.

As shown in FIGS. 1-3, a display housing 100 having an LCD display 104 is coupled to a mounting bracket 108 attached to handlebar 30. A right switch housing 190 supporting a mode switch 194, a rear derailleur upshift switch 198, and a rear derailleur downshift switch 202 is mounted to the right side of handlebar 30. Similarly, a left switch housing 250 supporting a mode switch 254, a front derailleur upshift switch 258, and a front derailleur downshift switch 262 is mounted to the left side of handlebar 30. The components disposed in right switch housing 190 are coupled to the components in display housing 100 through a communication path (e.g., wiring) 206, and the components disposed in left switch housing 250 are coupled to the components in display housing 100 through a communication path (e.g., wiring) 266. Mode switches 194 and 254 may be used to switch between a manual shifting mode and one or more automatic shifting modes, to change the information displayed on display 104, and so on. A derailleur control unit 310 is mounted to frame 14, and it is electrically coupled to the components in display housing 100 through an intermediate communication path (e.g., wiring) 314. A rear derailleur control housing 315 is mounted to rear derailleur 66, and it is electrically coupled to derailleur control unit 310 through an intermediate communication path (e.g., wiring) 316. Similarly, a front derailleur control housing 317 is mounted to front derailleur 62, and it is electrically coupled to derailleur control unit 310 through an intermediate communication path (e.g., wiring) 318. A crank rotation sensor 343 is provided for sensing signals from a magnet (not shown) coupled to the left side crank arm 38 to determine the rate of rotation of crank arms 38 in a known manner, and a wheel rotation sensor 345 is provided for sensing signals from a magnet 348 mounted to front wheel 26 to determine the speed of the bicycle in a known manner. Crank rotation sensor 343 and wheel rotation sensor 345 are coupled to derailleur control unit 310 through separate communication paths 346 and 347 (FIG. 3), respectively.

As shown in FIG. 3, display housing 100 further houses a main control unit 350, a manually-operated power switch 352, a manually-operated clutch reset switch 354, and an optional auto re-engage command circuit 355. Main control unit 350 includes a CPU 356, a memory 358, a clutch re-engagement circuit 359, and a signal generating unit 360. CPU 356 is a programmed processor that operates according to the information stored in memory 358. Signal generating unit 360 provides output signals to derailleur control unit 310 for controlling front derailleur 62 and rear derailleur 66 in response to input signals from the switches disposed in right switch housing 190 and left switch housing 250. Power switch 352 turns main control unit 350 on and off.

As described more fully below, clutch reset switch 354 provides a re-engage command signal to clutch re-engagement circuit 359, which functions as a re-engage command receiving circuit, so that the rider may manually command main control unit 350 to perform a clutch reset operation for rear derailleur 66. Optional auto re-engage command circuit 355 automatically detects a clutch disengagement condition and automatically provides a re-engage command signal to clutch re-engagement circuit 359 so that main control unit 350 may automatically perform a clutch reset operation for rear derailleur 66. Auto re-engage command circuit comprises a disengagement determining circuit 362 and a re-engage command signal providing circuit 364.

Clutch re-engagement circuit 359 comprises a motor drive circuit 366, which in this embodiment functions as a re-engagement circuit, and a re-engagement detecting circuit 368. Re-engagement detecting circuit 368 comprises a timer 370, a movement detecting circuit 372, and an optional position detecting circuit 374. The functions of these components are described below.

Figure 4:
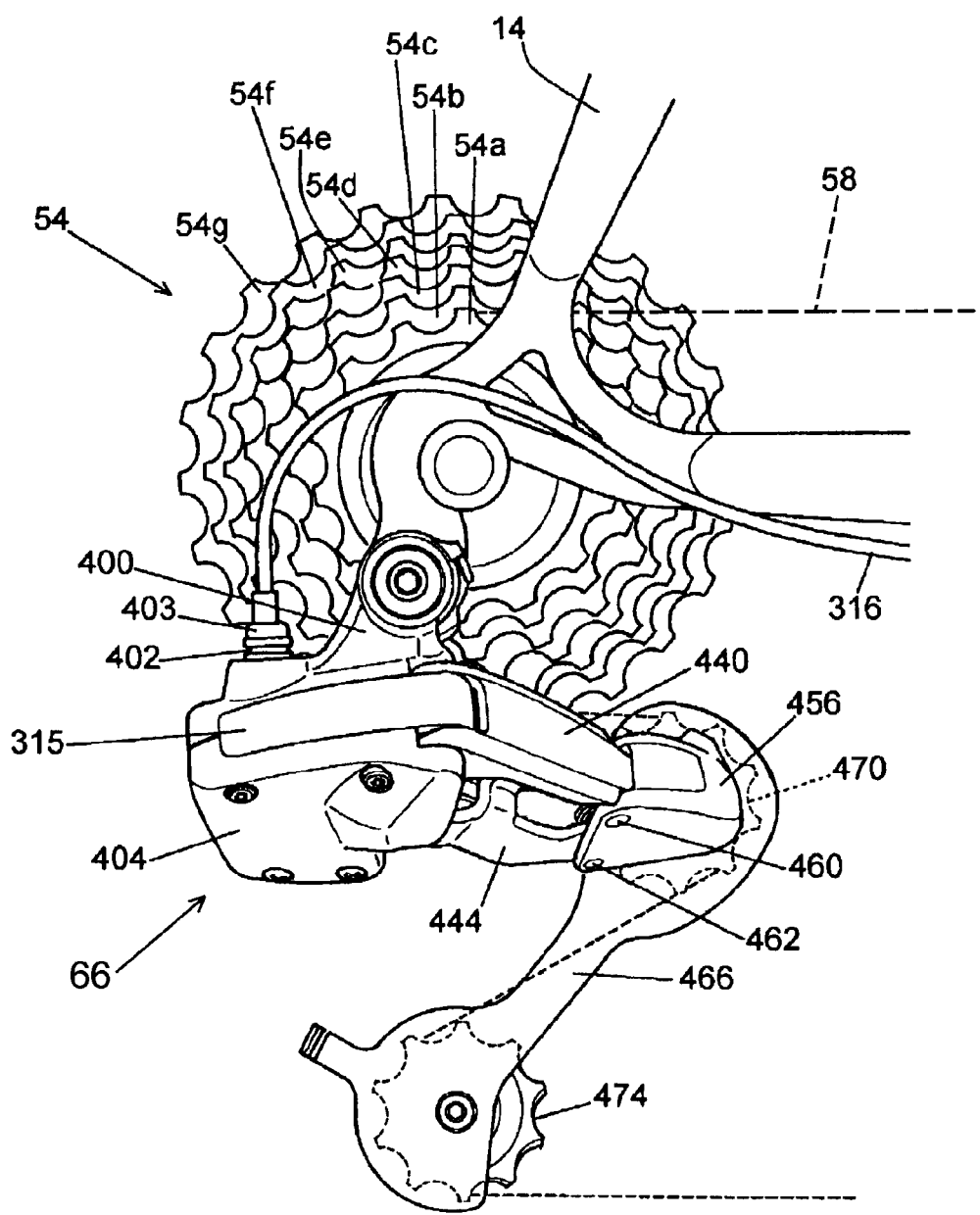
FIG. 4 is a closer view of the rear derailleur and sprocket assembly shown in FIG. 1, wherein the rear derailleur is shown in a top gear position.
Figure 5:
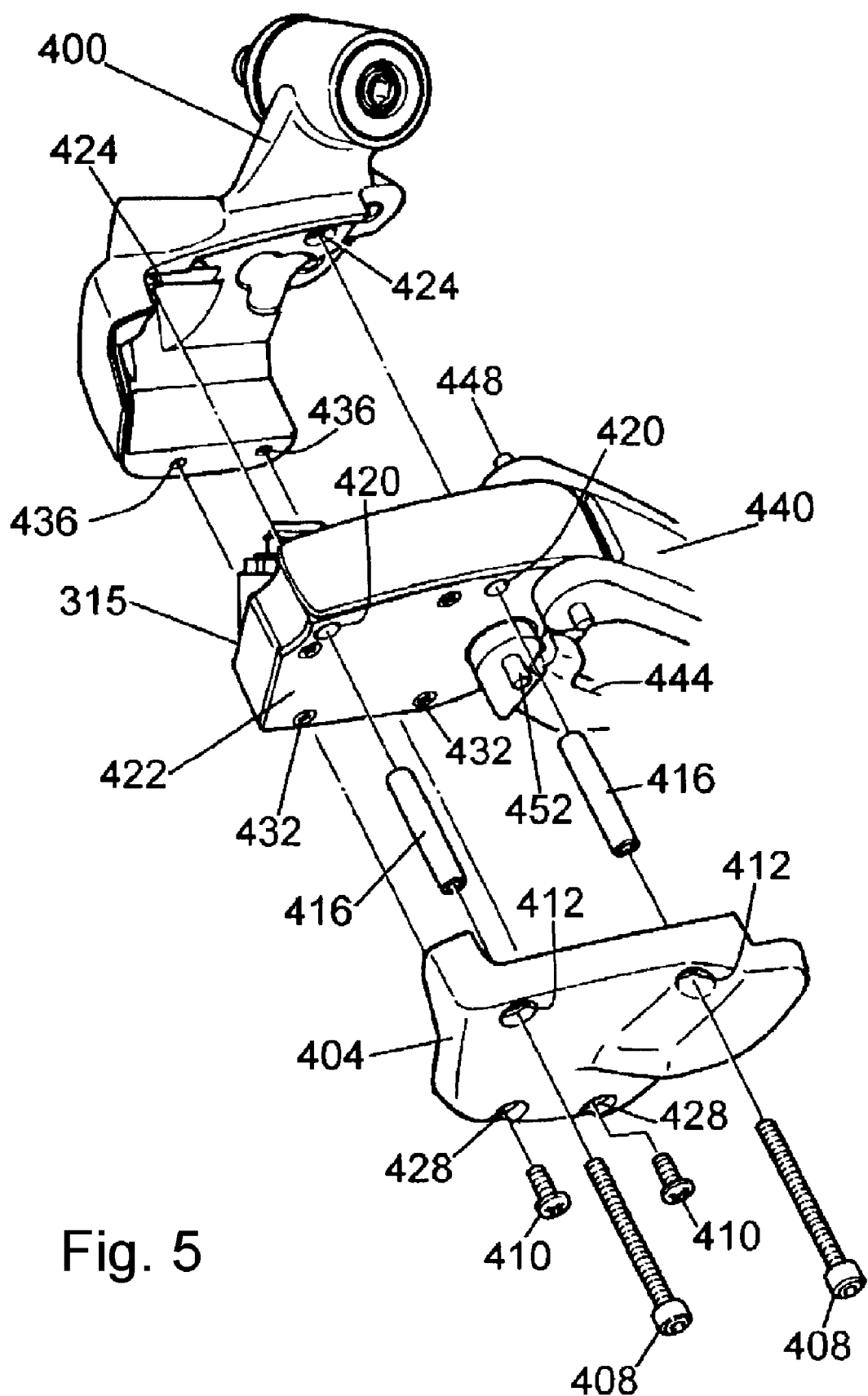
FIG. 5 is a partially exploded view of the derailleur shown in FIG. 4.

As shown in FIGS. 4 and 5, rear derailleur control housing 315 is mounted between a base member 400 and an outer cover 404 of rear derailleur 66. Base member 400 is swingably mounted to frame 14 in a known manner, and it includes an electrical connector 402 for connecting to a complementary connector 403 on intermediate communication path 316. As shown in FIG. 5, outer cover 404 and rear derailleur control housing 315 are mounted to base member 400 by screws 408 and 410. Screws 408 extend through openings 412 in outer cover 404, through spacer tubes 416 that extend through openings 420 in a rear derailleur control housing cover 422 and into threaded openings 424 in base member 400. Screws 410 extend through openings 428 in outer cover 404, through openings 432 in rear derailleur control housing cover 422, and into threaded openings 436 in base member 400.

Rear derailleur 66 further comprises a linkage mechanism in the form of link members 440 and 444 pivotably coupled to rear derailleur control housing 315 through respective pivot shafts 448 and 452. The other ends of link members 440 and 444 are pivotably coupled to a movable member 456 through respective pivot shafts 460 and 462. Movable member 456 rotatably supports a chain guide 466 which, in turn, rotatably supports a guide pulley 470 and a tension pulley 474 for engaging chain 58 in a known manner. As discussed in more detail below, a motor 480 (FIG. 6) rotates pivot shaft 452 for causing link member 444 to move movable member 456 and chain guide 466 laterally for transferring chain 58 among the plurality of rear sprockets 54a-54g.

Figure 6:
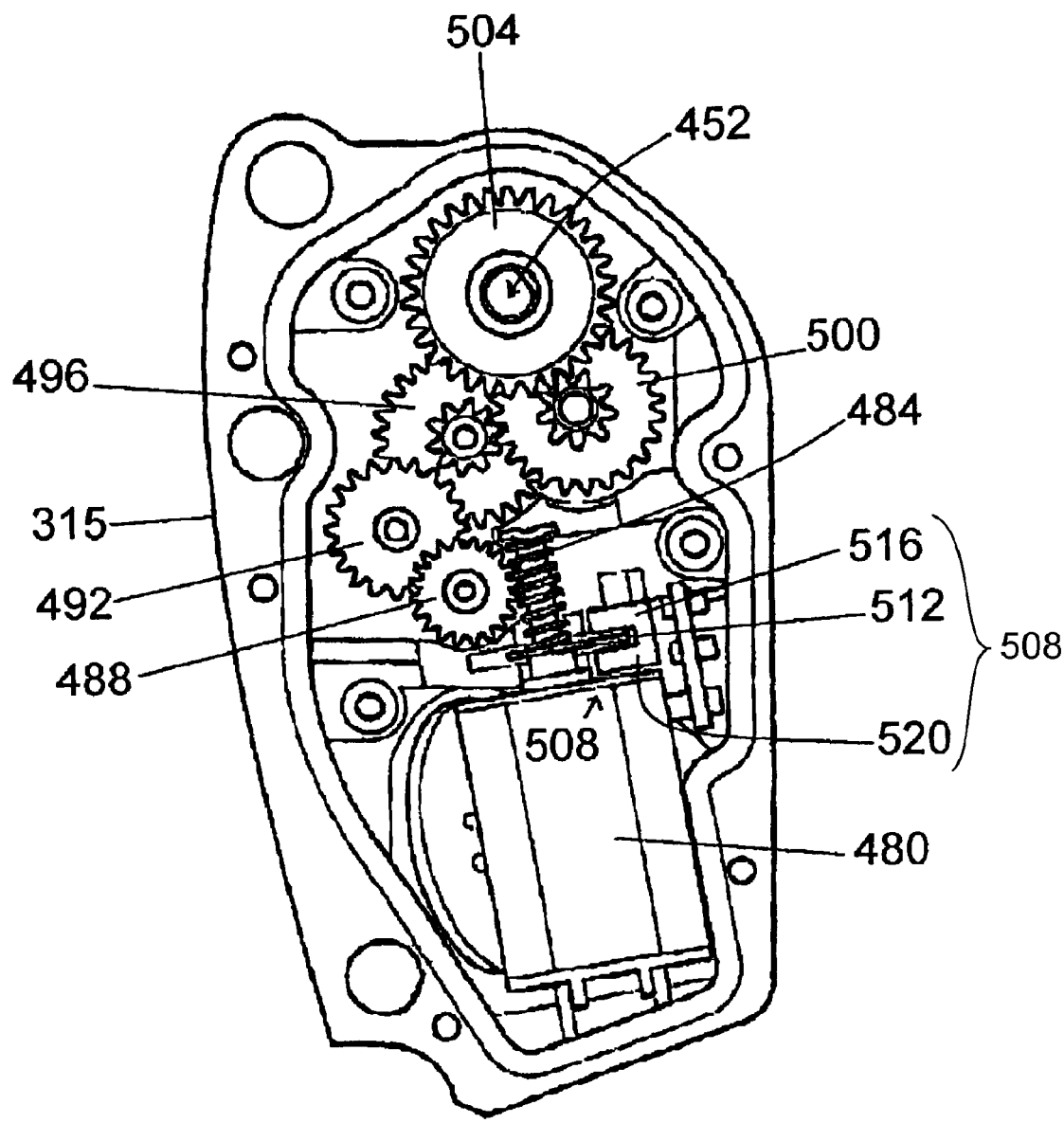
FIG. 6 is a view of the rear derailleur control housing illustrating a particular embodiment of a motor drive mechanism.

FIG. 6 is a view illustrating the contents of rear derailleur control housing 315 with rear derailleur control housing cover 422 removed. As shown in FIG. 6, motor 480 includes a pinion drive shaft 484 that drives pivot shaft 452 through a gear reduction mechanism comprising gears 488, 492, 496, 500 and 504, wherein a small diameter gear portion of each gear 488, 492, 496 and 500 drives a larger diameter gear portion of the next gear in the power transmission path. Gear 504 rotates integrally with pivot shaft 452. A digital signal providing mechanism in the form of a digital motion or position sensor 508 is mounted in rear derailleur control housing 315. In this embodiment, digital motion or position sensor 508 includes a shutter wheel 512 that rotates integrally with pinion drive shaft 484, a light source such as an LED 516 disposed on one side of shutter wheel 512, and a light detector such as a phototransistor 520 disposed on the other side of shutter wheel 512. Rotation of shutter wheel 512 with pinion drive shaft 484 causes the passage of light from LED 516 to phototransistor 520 to be intermittently blocked, thus producing a digital signal having a period determined by the rate of rotation of shutter wheel 512.

Figure 7:
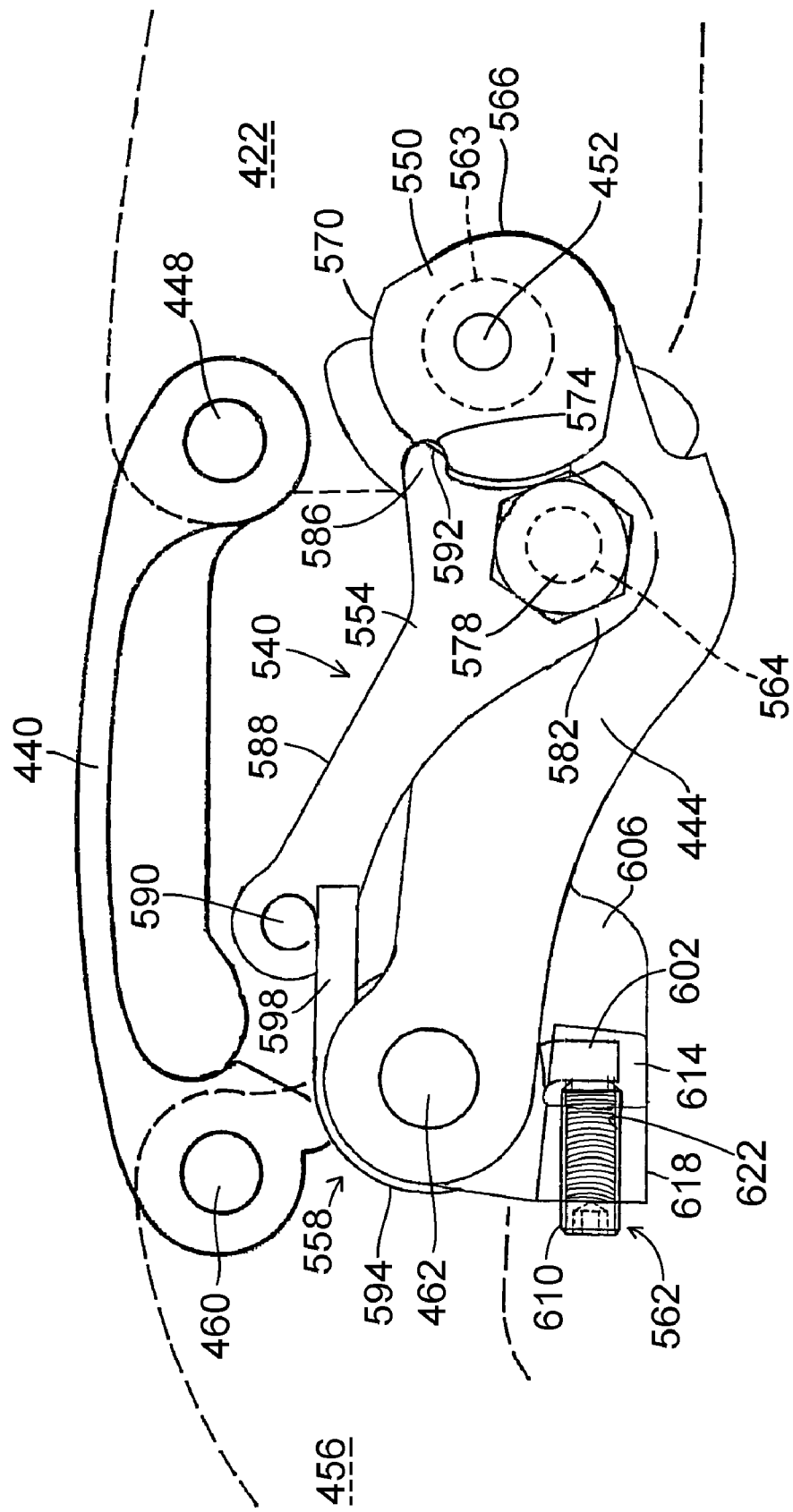
FIG. 7 is an inner side view of the linkage mechanism of the derailleur showing a drive member, a driven member, and a clutch.

FIG. 7 is an inner side view of the linkage mechanism showing a force communication mechanism 540 that communicates drive force from pivot shaft 452 to link member 444 in order to move movable member 456 relative to control cover housing 422 (and base member 400). In this embodiment, force communication mechanism 540 comprises a drive member 550 and a driven member 554 that forms a clutch (i.e., a releasable locking mechanism), a biasing unit 558, and a bias force adjusting unit 562. An optional drive member parameter sensor 563 and/or an optional driven member parameter sensor 564 are provided to drive member 550 and/or driven member 554, respectively, for use in an optional clutch reset operation described below. Sensors 563 and 564 may comprise potentiometers, optical sensors like sensor 508, or some other suitable sensor that accomplishes the functions described below.

Drive member 550 is coupled to pivot shaft 452 so that motor 480 rotates pivot shaft 452 and drive member 550 as a unit. For example, drive member 550 may be rigidly fixed to pivot shaft 452. Drive member 550 is a relatively thin plate-shaped member having a curved outer peripheral surface 566. An arcuate surface portion 570 has a generally constant radius of curvature but also includes an indentation 574 that functions as a detent in a manner described below.

Driven member 554 is pivotally coupled to link member 444 through a pivot shaft 578 that may have the form of a partially threaded screw. Driven member 554 comprises a base portion 582, a detent projection 586 in the form of a finger extending from base portion 582 and engaging indentation 574 in drive member 550, an elongated arm portion 588 extending from base portion 582 towards movable member 456, and a bias member engaging member 590 in the form of a pin located at the distal end of arm portion 588. In this embodiment, the tip of detent projection 586 is truncated to form a bearing surface 592 that has a radius of curvature approximately the same as the radius of curvature of arcuate surface 570 of drive member 550 for reasons discussed below.

Biasing unit 558 comprises a torsion spring 594 coiled around pivot shaft 462. Spring 594 has a first end 598 and a second end 602, wherein first end 598 engages (e.g., contacts) bias member engaging member 590 on driven member 554. Spring 594 applies a clockwise biasing force to driven member 554 so that detent projection 586 is pressed into indentation 574.

Bias force adjusting unit 562 adjusts the biasing force applied to driven member 554 and therefore functions as an engagement force adjusting unit that adjusts an engagement force of the clutch formed by detent projection 586 and indentation 574. Bias force adjusting unit 562 comprises a mounting boss 606 formed on link member 444 and an adjusting screw 610. Mounting boss 606 includes a recess 614 and a screw retainer 618, wherein recess 614 is dimensioned to receive second end 602 of spring 594 therein, and screw retainer 618 includes a threaded opening 622 for threadingly receiving adjusting screw 610 therein. As shown in FIG. 7, the right end of adjusting screw 610 contacts second end 602 of spring 594. Thus, moving adjusting screw 610 to the right increases both the clockwise biasing force on driven member 554 and the engagement pressure between detent projection 586 and recess 574, and moving adjusting screw 610 to the left decreases both the clockwise biasing force on driven member 554 and the engagement pressure between detent projection 586 and recess 574.

When it is desired to change gears, motor 480 rotates shaft 452 and drive member 550 either clockwise or counterclockwise depending upon whether an upshifting operation or a downshifting operation is desired. Because of the engagement pressure between detent projection 586 and indentation 574 caused by spring 594, drive member 550, driven member 554 and link member 444 rotate together around the axis defined by shaft 452, and movable member 456 moves relative to control cover housing cover 422 (and base member 400) accordingly.

Figure 8:
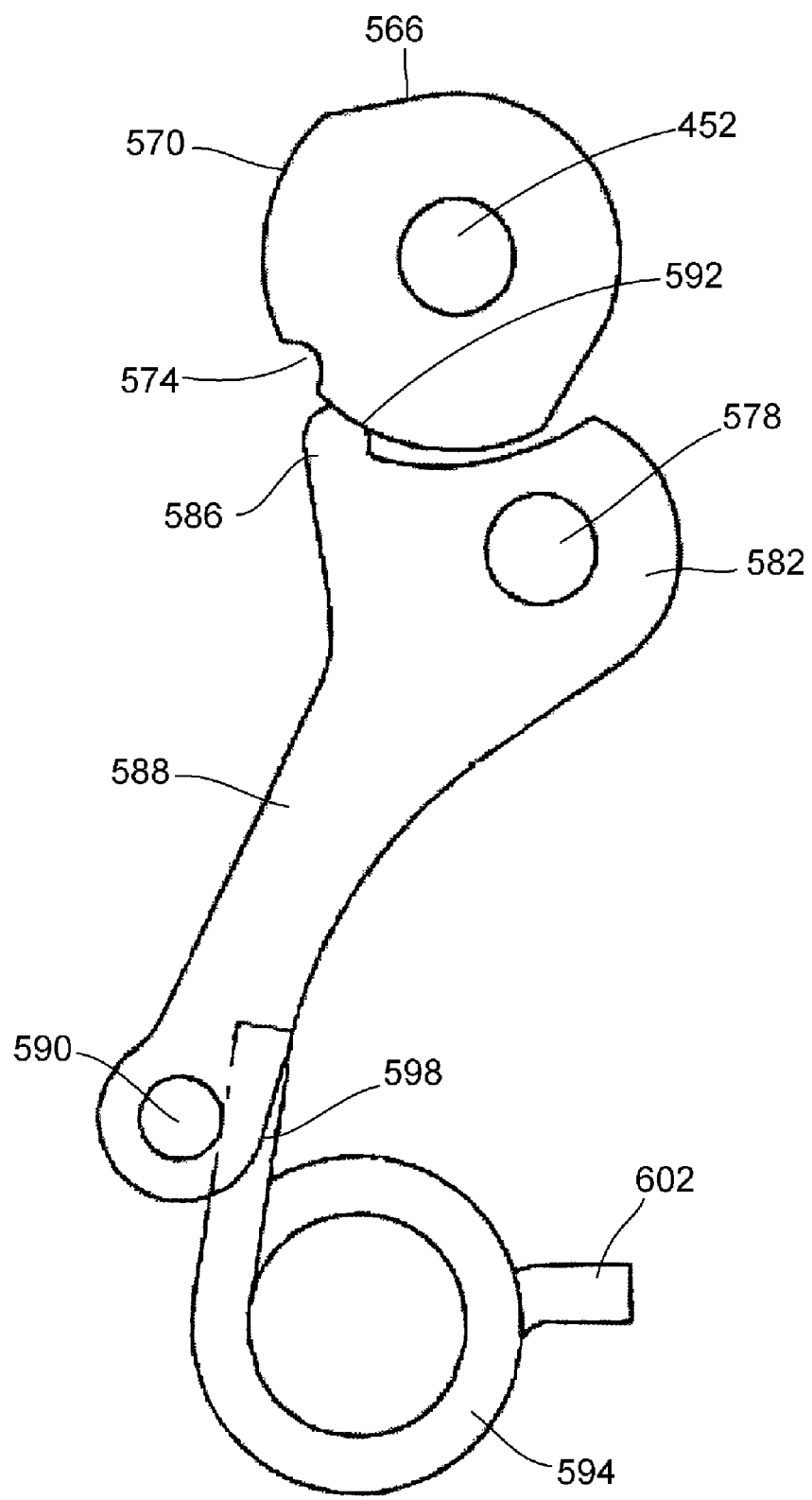
FIG. 8 is a view of the clutch in a disengaged state.

FIG. 8 schematically illustrates the operation of drive member 550 and driven member 554 when movable member 456 experiences an excessive amount of resistance to movement when drive member 550 rotates clockwise (e.g., resistance to upward movement of movable member 456 in FIG. 7). When the rotational force of drive member 550 exceeds the engagement pressure between detent projection 586 and indentation 574, driven member 554 pivots counterclockwise around pivot shaft 578, and detent projection 586 disengages from indentation 574 as shown. The force required to disengage detent projection 586 from indentation 574 may be adjusted by bias force adjusting unit 562.

The same operation occurs when movable member 456 experiences an undesirable external force (e.g., a downward force in FIG. 7). In this case, when the undesirable external force applied to movable member 456 exceeds the engagement pressure between detent projection 586 and indentation 574, driven member 554 pivots counterclockwise around pivot shaft 578, and detent projection 586 disengages from indentation 574 in the same manner shown in FIG. 8.

Disengagement of detent projection 586 from indentation 574 also occurs when movable member 456 experiences an excessive amount of resistance to movement when drive member 550 rotates counterclockwise (e.g., resistance to downward movement of movable member 456 in FIG. 7) and when movable member 456 experiences an undesirable upward external force. In that case, drive member 550 moves counterclockwise relative to detent projection 586.

As noted above, in this embodiment the tip of detent projection 586 is truncated to form bearing surface 592 that has a radius of curvature approximately the same as the radius of curvature of arcuate surface 570 of drive member 550. Thus, when detent projection 586 disengages from indentation 574, detent projection 586 contacts arcuate surface 570 with a greater surface area than would occur if detent projection 586 were simply arcuate. One benefit of such a structure is that detent projection 586 need not reengage indentation 574 before derailleur 66 can continue operating once the excessive resistance or undesirable force is removed. The biasing force of spring 594 can be set so that sufficient frictional force exists between bearing surface 592 and arcuate surface 570 to allow drive member 550, driven member 554 and link member 444 to move together as a unit when the excessive resistance or undesirable external force is absent. In other words, bearing surface 592 and arcuate surface 570 themselves may function as a clutch.

Detent projection 586 may be re-engaged with indentation 574 by manual manipulation of movable member 456. Alternatively, detent projection 586 may be re-engaged with indentation 574 by pressing clutch reset switch 354. In this embodiment, pressing clutch reset switch 354 causes clutch reset switch 354 to provide a re-engage command signal to clutch re-engagement circuit 359. Clutch re-engagement circuit 359 then activates motor drive circuit 366 to provide a motor drive signal that causes motor 480 to move drive member 550 in a direction so that detent projection 586 re-engages indentation 574. In one embodiment, motor 480 simply rotates drive member 500 in the opposite direction from the direction of the unsuccessful gear shift operation. In this embodiment, however, motor 480 rotates drive member 550 in a direction towards and end of a range of motion of drive member 550. More specifically, motor 480 rotates drive member 550 in a direction towards a position corresponding to a top gear position of derailleur 66. If detent projection 586 re-engages indentation 574 during that time, then the added resistance caused by the coupling will momentarily stop the rotation of drive member 550. If no rotation of pinion drive shaft 484 is detected by sensor 508 for a selected time interval (e.g., 40 ms) determined by timer 370, then it is concluded that the clutch has been reset, and the reset operation ceases. Otherwise, motor 480 continues to rotate drive member 550 towards the top gear position, and then clutch re-engagement circuit 359 activates motor drive circuit 366 to provide a motor drive signal that causes motor 480 to move drive member 550 in the opposite direction. Eventually, detent projection 586 re-engages indentation 574, the re-engagement is detected by re-engagement detecting circuit 368 in the manner noted above, and the reset operation ceases.

While the clutch reset operation was manually commanded by pressing clutch reset switch 354 in the above embodiment, optional auto re-engage command circuit 355 could be used to automatically provide re-engage command signals to clutch re-engagement circuit 359. In that case, optional drive member parameter sensor 563 and/or optional driven member parameter sensor 564 form part of auto re-engage command circuit 355 to determine when an operational parameter of at least one of drive member 550 or driven member 554 does not correspond to an expected parameter. For example, drive member parameter sensor 563 could be a position sensor that indicates when drive member 550 is not in a proper position for a currently selected gear. Similarly, driven member parameter sensor 564 could be a position sensor that indicates when driven member 554 is not in a proper position for a currently selected gear. Driven member parameter sensor 564 could be a motion sensor that indicates when driven member 554 is not moving when motor 480 is being driven. Drive member parameter sensor 563 also could be a motion sensor to help make such a determination. Drive member parameter sensor 563 and driven member parameter sensor 564 both could be position sensors for determining when a position of drive member 550 relative to driven member 554 does not correspond to an expected position, such as an expected position of drive member 550 relative to driven member 554.

While re-engagement of detent projection 586 with indentation 574 was determined in the basic embodiment based on the stopping of pinion drive shaft 484, other methods may be employed. For example, optional position detecting circuit 374 could comprise drive member parameter sensor 563 and driven member parameter sensor 564, both configured as position sensors. In this case, position detecting circuit 374 can detect a position of drive member 550 relative to driven member 554 that corresponds to engagement of detent projection 586 with indentation 574.

In general, the overload protection clutch is disposed in a power transmission path between motor 480 and link member 444. In other words, in this embodiment, the clutch may be located somewhere in a power transmission path leading from pinion drive shaft 484, through gears 488, 492, 496, 500 and 504, through pivot shaft 452, through drive member 550, through driven member 554, through pivot shaft 578, and through link member 444 so that the clutch disengages when substantial resistance exists somewhere within this power transmission path. Of course, the actual location of the clutch may vary depending upon the particular configuration of the motorized derailleur.

While the above is a description of various embodiments of inventive features, further modifications may be employed without departing from the spirit and scope of the present invention. While link member 444 was formed as a single member, it may be preferable from a manufacturing standpoint to form link member 444 as two members attached together through screws, rivets, etc. to facilitate the assembly of spring 594 on pivot shaft 462, to facilitate the construction of mounting boss 606, or for other reasons. While indentation 574 was formed as a recess in drive member 550, any opening or other structure that functions as a detent or a releasable locking structure may be used, and such a structure meets the definition of an indentation. While adjusting screw 610 was used to adjust the biasing force of spring 594 in a continuous manner, other continuously adjusting structures could be used. Alternatively, the biasing force could be adjusted in discrete steps by inserting second end 602 of spring 594 into openings formed in mounting boss 606.

Detent projection 586 need not be truncated and may be formed as a simple arc or have some other shape. While base portion 582 was formed generally disk-shaped, base portion 582 may be elongated or have some other shape to suit the application. The teachings herein may be applied to a front derailleur. Spring 594 need not be a coil spring, and it may constitute any number of integrated biasing elements. The drive member and driven member are not limited to drive member 550 and driven member 554. The drive member and the driven member may be distributed anywhere in the power transmission path from pinion drive shaft to chain guide 466.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, including the structural and/or functional concepts embodied by such a feature alone or in combination with other features, also should be considered a separate description of further inventions by the applicant. Thus, the scope of the invention should not be limited by the specific structures disclosed or the apparent initial focus on a particular structure or feature.

What is claimed is:

1. An apparatus for controlling a derailleur, wherein the derailleur includes a motor that drives a drive member, a driven member driven by the drive member, and a clutch having a first element that disengages from a second element when substantial resistance exists in a power transmission path between the drive member and the driven member, wherein the apparatus for controlling the derailleur comprises:
    a re-engage command receiving circuit that receives a re-engage command signal to re-engage the first element with the second element when the first element is disengaged from the second element; and
    a re-engagement circuit that re-engages the first element with the second element in response to the re-engage command signal;
    wherein the re-engagement circuit comprises a re-engagement detecting circuit that detects when the first element re-engages with the second element.

2. The apparatus according to claim 1 wherein the re-engagement circuit provides a motor drive signal that causes the motor to move the drive member in a direction so that the first element re-engages the second element.

3. The apparatus according to claim 2 wherein the motor drive signal causes the motor to move the drive member in a direction towards and end of a range of motion of the drive member.

4. The apparatus according to claim 3 wherein the motor drive signal causes the motor to move the drive member in a direction towards a position corresponding to a top gear position of the derailleur.

5. The apparatus according to claim 3 wherein the motor drive signal causes the motor to move the drive member to the end of the range of motion of the drive member and then causes the motor to move the drive member in an opposite direction.

6. The apparatus according to claim 1 wherein the re-engagement circuit provides a motor drive signal that causes the motor to move the drive member in a direction so that the first element re-engages the second element.

7. The apparatus according to claim 6 wherein the re-engagement detecting circuit comprises a movement detecting circuit that detects movement of the drive member, and wherein the re-engagement detecting circuit detects re-engagement of the first element with the second element when the movement detecting circuit does not detect movement of the drive member for a selected time interval.

8. The apparatus according to claim 6 wherein the re-engagement detecting circuit comprises a position detector that detects an engagement position of the first element relative to the second element.

9. The apparatus according to claim 8 wherein the position detector detects a position of the drive member relative to the driven member that corresponds to engagement of the first element with the second element.

10. The apparatus according to claim 1 further comprising a re-engage command circuit that provides the re-engage command signal.

11. The apparatus according to claim 10 wherein the re-engage command circuit comprises a manually operated switch.

12. An apparatus for controlling a derailleur, wherein the derailleur includes a motor that drives a drive member, a driven member driven by the drive member, and a clutch having a first element that disengages from a second element when substantial resistance exists in a power transmission path between the drive member and the driven member, wherein the apparatus for controlling the derailleur comprises:
   a re-engage command circuit that provides a re-engage command signal, wherein the re-engage command circuit comprises:
      a parameter sensor that senses an operational parameter associated with at least one of the drive member or the driven member;
      a disengagement determining circuit operatively coupled to the parameter sensor to determine when the operational parameter does not correspond to an expected value; and
      a re-engage command signal providing circuit operatively coupled to the disengagement determining circuit to provide the re-engage command signal when the disengagement determining circuit determines that the operational parameter does not correspond to the expected value;
   a re-engage command receiving circuit that receives the re-engage command signal to re-engage the first element with the second element when the first element is disengaged from the second element; and
   a re-engagement circuit that re-engages the first element with the second element in response to the re-engage command signal.

13. The apparatus according to claim 12 wherein the disengagement determining circuit determines when the operational parameter does not correspond to the expected value when the drive member is driven by the motor.

14. The apparatus according to claim 12 wherein the parameter sensor senses a position of the drive member relative to the driven member, and wherein the disengagement determining circuit determines when a position of the drive member relative to the driven member does not correspond to an expected position of the drive member relative to the driven member.

15. A bicycle derailleur apparatus comprising:
   a base member adapted to be mounted to a bicycle frame;
   a movable member that rotatably supports a chain guide;
   a linkage mechanism coupled between the base member and the movable member;
   a motor that drives a drive member;
   a driven member driven by the drive member;
   a clutch having a first element that disengages from a second element when substantial resistance exists in a power transmission path between the drive member and the driven member;
   a re-engage command receiving circuit that receives a re-engage command signal to re-engage the first element with the second element when the first element is disengaged from the second element; and
   a re-engagement circuit that re-engages the first element with the second element in response to the re-engage command signal;
   wherein the re-engagement circuit comprises a re-engagement detecting circuit that detects when the first element re-engages with the second element.

* * * * *